UNITED STATES PATENT OFFICE.

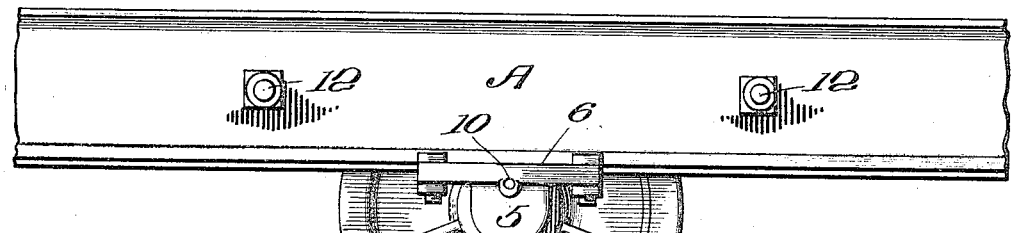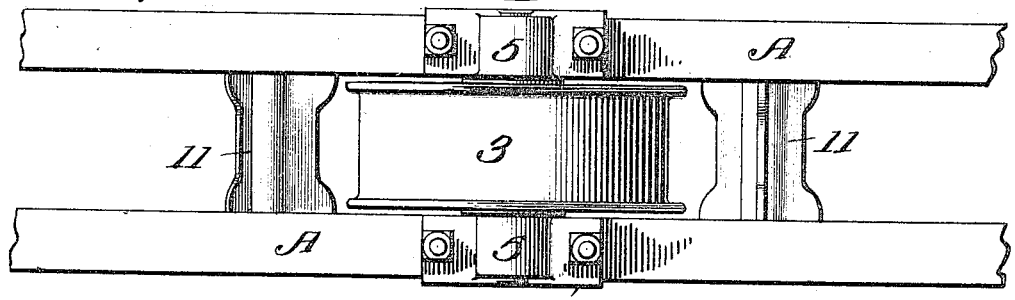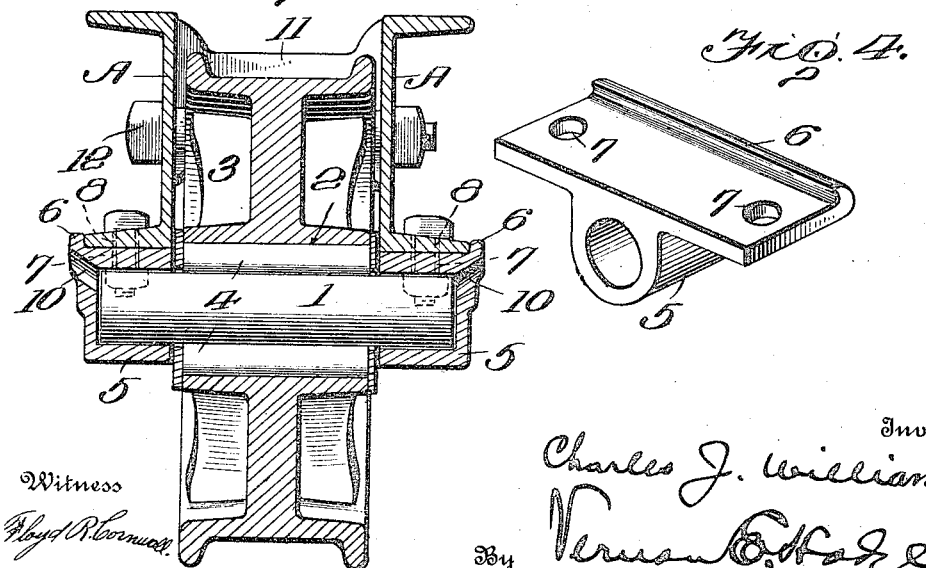

CHARLES JUDSON WILLIAMS, JR., OF JACKSONVILLE, FLORIDA, ASSIGNOR TO L. MOORE DRY KILN CO., OF JACKSONVILLE, FLORIDA, A CORPORATION OF FLORIDA.

WHEEL-MOUNT FOR TRUCKS.

1,260,113.  Specification of Letters Patent.  Patented Mar. 19, 1918.

Application filed October 19, 1916. Serial No. 126,586.

*To all whom it may concern:*

Be it known that I, CHARLES J. WILLIAMS, Jr., a citizen of the United States, residing at Jacksonville, in the county of Duval and State of Florida, have invented certain new and useful Improvements in Wheel-Mounts for Trucks, of which the following is a specification.

My invention relates to an improvement in wheel mounts for trucks.

Where the axle is stationary, as in the Morton type of truck, commonly used for this purpose, after years of constant use with a heavy load on the truck, the axle will wear flat on the lower side; and the object of my present invention is to provide a truck which will overcome this difficulty. This invention consists in a free rotary axle with roller bearings between it and the hub of the wheel, in connection with a journal-box removably secured to the frame of the truck, and adapted to freely support the ends of the rotatable axle.

My invention further consists in other novel features of construction and combinations of parts which will be hereinafter described and pointed out in the claims.

In the accompanying drawings:—

Figure 1 is a side view;

Fig. 2 is a plan;

Fig. 3 is a transverse section; and

Fig. 4 is a view in perspective of one of the axle-journal-boxes.

A, A, represent the side bars constituting the framework of the truck. These are preferably made of steel channel-iron, as shown, although they might be made of any suitable stock for the purpose.

The numeral 1 is the axle. This is perfectly round, and is inserted through the hub 2 of the wheel 3 surrounded by bearing rollers 4, 4, loosely fitting the space between the axle and the bore of the hub, and its ends are loosely journaled in the journal-boxes 5, 5. These latter are preferably provided with flanges 6, 6, at their outer edges to embrace the flanges of the channel-iron, and provided with holes 7, 7, which register with the holes 8, 8, in the lower flange of the channel-iron, which are adapted to receive bolts for securing the journal-boxes thereto.

Oil holes 10 are formed in these journal-boxes, wherein to receive oil to supply the journal-boxes, axle, and roller-bearings with oil from either side of the truck.

The channel-iron sides of the frame A, A, are held apart by spreaders or spacers 11, 11, through which bolts 12, 12, pass, thereby gaging the sides and holding them the proper distance apart, and forming with the sides and bolts a rigid frame for the dry-kiln trucks. These spacers or spreaders are preferably made of malleable iron, and three-sided, to give an extended bearing at their ends upon the inner walls of the side bars of the frame.

With a truck thus constructed, not only is the frame rigid, but its parts are easily assembled and taken apart, and with a free rotary axle chamber turning idle with the wheel, the symmetrical form of the axle is preserved, as it wears equally at the ends, in the journal-boxes and at the center upon which the wheel turns.

The flanges on the journal-boxes assist in holding them in position, and readily gage them in place when the parts are assembled, they fitting the flange of the channel-iron and embracing the outer edges thereof, thus bringing the holes of the journal-boxes and flanges of the channel-irons into registry.

One of the principal advantages of my present invention is that the parts are easily made from stock material, as well as conveniently assembled and taken apart. For instance, the axle may be cut from a rod without even being turned, or more than slightly ground, just as with the bearing rollers themselves, and the spacers or spreaders are cast to form, and the bolts are the proper length, as are the journal-boxes the proper size, so that all parts are easily supplied, assembled or separated.

I claim:

1. In a wheel mount for trucks, the combination of outwardly flanged side bars suitably spaced apart and secured in position, a wheel removably inserted between and from beneath said flanged side bars, an axle of greater length than the space between the side bars extending through the hub of the wheel, and flanged journal boxes having oil holes therein, the flanges of these journal boxes embracing the outer edges of the flanges of the side bars, said journal boxes bolted beneath the flanges of the side bars whereby the wheel, axle and journal boxes may be removed from the side bars by removing the nuts from the bolts which secure the journal boxes to the flanges.

2. In a wheel mount for trucks, the combination of channel iron side bars, spacers interposed therebetween, means securing the side bars and spacers rigidly together, a wheel located in the space between the side bars and spacers, an axle extending through the hub of the wheel, said axle of greater length than the wheel hub and its ends extending beneath the lower flanges of the channel iron side bars, journal boxes having orifices extending part-way only therethrough to receive the ends of the axle, said journal boxes fashioned to fit and embrace the lower flanges of the channel iron side bars from beneath, and means for detachably securing said journal boxes directly to the lower flanges of the channel iron side bars.

In testimony whereof I affix my signature.

CHARLES JUDSON WILLIAMS, Jr.

Copies of this patent may be obtained for five cents each, by addressing the "Commissioner of Patents, Washington, D. C."